June 2, 1931.  W. J. HOGG ET AL  1,808,138
COLLAPSIBLE TAP
Filed Jan. 19, 1928  2 Sheets-Sheet 1
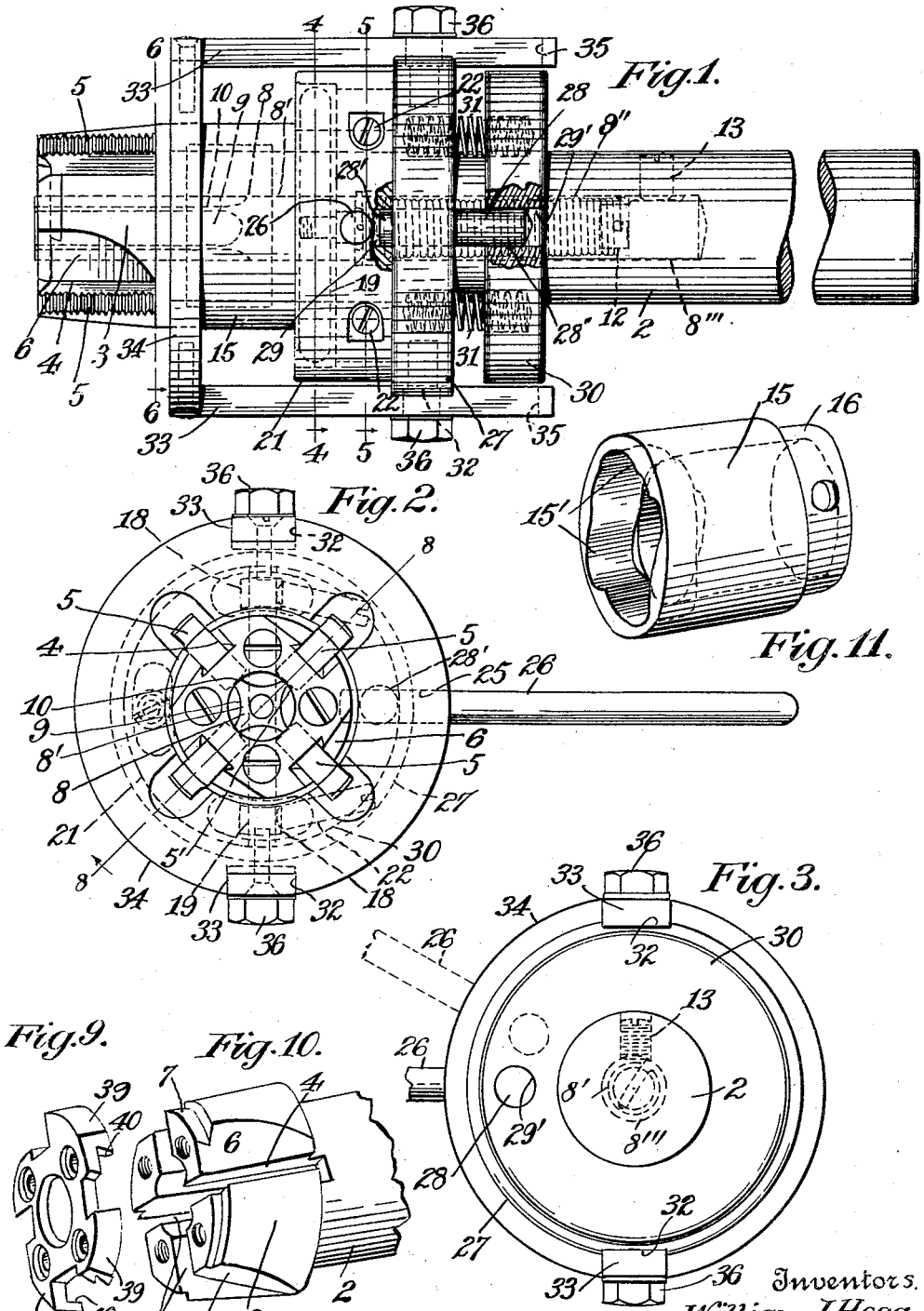
Inventors.
William J. Hogg
Frederick Neumann
By their Attorney Inventors
William J. Hogg
Frederick Neumann
By their Attorney Patented June 2, 1931

1,808,138

UNITED STATES PATENT OFFICE

WILLIAM J. HOGG AND FREDERICK NEUMANN, OF CLEVELAND, OHIO, ASSIGNORS TO THE NATIONAL ACME COMPANY, OF CLEVELAND, OHIO, A CORPORATION OF OHIO

COLLAPSIBLE TAP

Application filed January 19, 1928. Serial No. 247,770.

This invention relates to collapsible taps, the object of the invention generally being the provision of an improved collapsible tap of that class in which the cutters or chasers will be automatically released from the work after the tap has cut the required length, so that the tap may be removed from the work without the necessity of reversing or backing off of the threaded piece,—the present invention being an improvement upon that shown and described in Patent No. 1,318,179, dated October 7, 1919, and owned by The National Acme Company, the assignee of the present invention.

The particular object of the present invention is the provision of an improved tap in which the cutters will be prevented from tipping and in which also a positive tripping or retraction of the cutters is obtained.

A further object of the invention is the provision of an improved collapsible tap in which the cutters are positively supported not only on their inner faces, but also on outer faces thereof, whereby they are prevented from tipping, and in which the cutters are also not only given a positive outward movement, but also a positive inward movement, whereby the cutters are positively tripped or collapsed, and which two supporting and operating means are, in the form shown, connected together for simultaneous rotary movement.

A still further object of the invention is the provision of an improved tap which can be readily freed from chips and dust without the necessity of taking the tap apart.

In the patent referred to the cutters were positively supported on their inner faces and outwardly shifted by a core piece, but were not positively supported on their outer faces, and were tripped or collapsed by means of spring-pushed plungers or pins, in consequence of which there was a tendency when the tap entered the work to raise or spread the rear ends of the cutters away from the core piece, causing the forward tipping of the cutters, resulting in cutting a tapered piece of work owing to the fact that the wedge-shaped notch 14 of each cutter in engagement with each pointed or tapered end of the spring-actuated plunger pin 15 had a tendency to push out the pin or plunger and thus allow the cutters to shift or raise up at their rear end and so cause the cutting of a tapered thread.

Furthermore, the collapsing or tripping of the cutters depended entirely upon the spring-action of these spring-actuated pins and was by no means positive, the quick and prompt collapsing of the cutters depending upon the resiliency and condition of the springs of these pins.

In that patent, also, by reason of the construction of the end plate, it was difficult not only to prevent the clogging of the cutters by the fine chips and dust, but also difficult to remove these particles without disassembling the tap—which required time and labor.

In the present invention these disadvantages have been avoided and the cutters are prevented from tipping, so that they will cut straight threads or, when tapered cutters are used, a more accurate taper is obtained. Moreover, the cutters are not only positively supported both at their inner and outer faces, but are positively shifted and guided inward and outward, and in consequence the accuracy of the work is very much increased.

In the drawings accompanying and forming a part of this specification—

Figure 1 is a side view of this improved collapsible tap, parts thereof being shown in dotted lines and in section;

Fig. 2 is a front end view of the tap;

Fig. 3 is a rear end view of the tap, parts thereof being shown in dotted lines;

Fig. 9 is a perspective view of the end plate;

Fig. 10 is a perspective view of the head of the tap with the cutters removed; and Fig. 11 is a perspective view of the cam sleeve or ring for supporting the exterior faces of the cutters and retracting or collapsing the cutters.

Similar characters of reference indicate corresponding parts in the several views.

Figure 4:
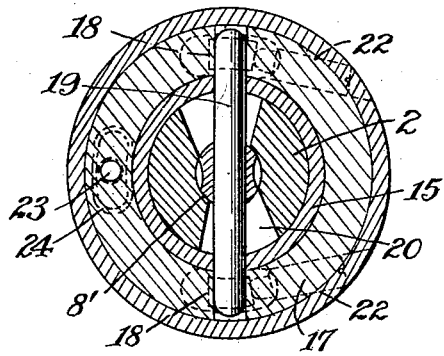
Fig. 4 is a cross-sectional view taken on line 4—4 of Fig. 1.
Figure 5:
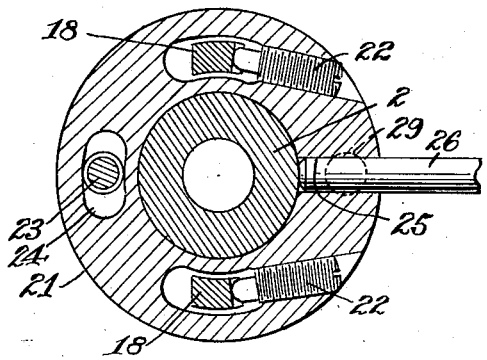
Fig. 5 is a cross-sectional view taken on line 5—5 of Fig. 1.
Figure 6:
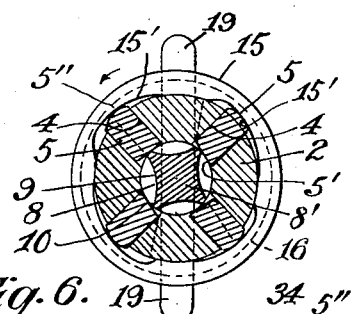
Figs. 6 and 7 are cross-sectional views of a part of the tap illustrating, respectively, the position of the cutters and core pieces when the cutters are shifted outwardly and the position thereof when the cutters are shifted inwardly by the cam sleeve.
Figure 7:
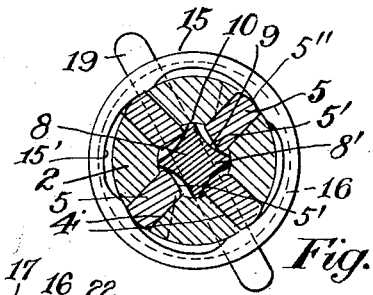

Before explaining in detail the present improvement and mode of operation thereof, we desire to have it understood that the invention is not limited to the details of construction and arrangement of parts which are illustrated in the accompanying drawings, since the invention is capable of other embodiments, and that the phraseology which we employ is for the purpose of description and not of limitation.

In the preferred form shown in the drawings, this improved tap comprises a centrally-bored cylindrical rod or shank 2 for attachment to the spindle or the tool-carrying turret of a metal working machine, by means of which the tap is usually reciprocated, respectively, into position to perform its work and away from the work after the tapping is finished, the tap or the work being rotated for threading the piece. The forward end of this rod is provided with an enlarged tapered and radially-slotted head 3 which, together with the shank 2, comprises what may be properly termed the body of the tap.

In the slots 4 of this head the chasers or cutters 5 are located and guided during their inward and outward movements. The forwardly-tapered head is at one side of each slot slabbed off, as at 6, and is rabbeted, as at 7, for the reception of the end cap hereinafter described.

Figure 8:
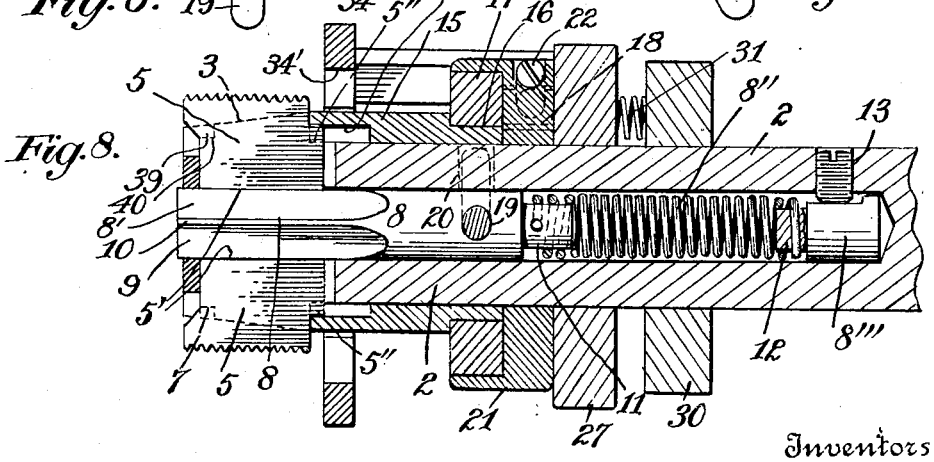
Fig. 8 is a longitudinal sectional view of this improved tap, the view taken on line 8—8 of Fig. 2.

Located in the bore of this body is a core piece or member 8 constructed, in the present instance, of three members or sections 8', 8'' and 8'''. The front member 8' has its end adjacent to the under faces or edges of the cutters provided with four curved or concaved sides 9 forming four cutter-engaging corners or edges 10. The front end of the core projects beyond the head and is enclosed in the manner hereinafter described by an end plate or cap. The rear end of this core piece, 8', is provided with a projection 11 having an opening for the reception of one end of a coiled spring 8'', forming the second member of the core piece, and the opposite end of this spring is received in an opening of a projection 12 carried by a short slabbed member 8''', forming the third member of the core piece. These three members or parts are assembled before they are slipped into the bore of the shank and are held in position by a set-screw 13 (see Fig. 8) engaging the slabbed-off portion of the member 8'''. After this core piece is inserted into the bore, it is, by means of a wrench or by holding it in a vise, given two or three turns, thereby to wind up the spring 8'' to the desired tension—it being held in this condition by the cross-pin hereinafter described. The turning or rotation of the core piece 8 in one direction shifts the cutters outwardly, and the reverse movement of the core piece permits the cutters to be collapsed. Each of the cutters is provided with an inclined or cam-faced under edge 5' for co-operation with the core piece. Each of the cutters is also provided with a projecting tail end 5'' suitably cammed or formed for co-operation with the cam ring or sleeve about to be described. This projecting end 5'' of each cutter extends rearwardly of the head, for which purpose the radial slots 4 of the head likewise extend rearwardly thereof.

Encircling the shank adjacent to the rearwardly-projecting ends of the cutters is a cam ring or sleeve 15 having four similarly-formed cam portions 15' on the interior forward edge thereof for engagement with the projecting tail end of the cutters, the cam faces of the sleeve being so formed that they are always in positive engagement with the rear ends of the cutters, so that the forward tipping of the cutters when in engagement with the work is positively prevented, while at the same time, on the rotation of this cam sleeve, the cutters are positively collapsed. By a suitable adjustment of this cam sleeve in the manner hereinafter described, the adjustment of the cutters is regulated to the required size of the work to be tapped. This cam sleeve is recessed at its rear end 16, and located thereon is a ring 17 having a pair of rearwardly-projecting lugs 18. This ring 17 and cam sleeve 15 are pinned to the core piece 8 by a cross-pin 19, and for this purpose the shank of the tap is provided with a transverse elongated slot 20 which thus permits the adjustment or rotation of the cam sleeve 15 and ring 17 together with the core piece 8 to which these members are pinned. Located on this ring 17 is a cap 21 carrying a pair of adjusting screws 22 for engagement with the rearwardly-projecting lugs 18 of the ring 17, this cap being secured to the ring by a set-screw 23 passing through an elongated slot 24 in the rear wall of the cap, so that when the cap is held or locked by the means hereinafter described against rotary movement, the adjustment of these adjusting screws 22 will simultaneously adjust the cam ring and core piece and thereby position the cutters to tap the desired size of work. The cap is provided with an opening 25 for the reception of a suitable handle 26, whereby the cam ring and core piece may be simultaneously turned to throw out the cutters into position to tap the work after they have been collapsed, and this handle may be either manually operated or automatically operated, as found desirable in practice. In the rear of this cap 21 and mounted upon the shank of the tap for shiftable or sliding movement, is a locking ring or collar 27 carrying a transversely-extending pin 28, one end of which, as 28', projecting forwardly of the ring and the opposite end, at 28", rearwardly thereof, the forward end extending into an opening 29 in the rear wall of the cap 21 and forming the means for holding or locking the cutters in their adjusted or working positions by reason of the engagement of the adjusting screws 22 with the lugs 18 of the ring 17. The rear end 28" of this pin is in position to engage in a similar opening 29' of a fixed ring or collar 30 which is pinned or fastened to the shank and which serves as a guide for the locking collar 27 as the pin 28' is shifted out of the cap opening 29. Between these two rings 27 and 30 is located a pair of springs 31, the ends of which extend into openings formed in the rings, and which springs are compressed when the shiftable locking collar or ring 27 is moved rearwardly by the means hereinafter described.

The shiftable locking collar 27 is provided with a pair of peripheral transverse slots or recesses 32, in which is located a pair of bars 33, the forward ends of which are secured to a disk 34 suitably formed to be slipped over the head of the tap and the cutters and radially recessed, as at 34', to permit the radial movement of the cutters. These bars at their rear ends are provided with elongated slots 35 and are secured in the recesses 32 of the shiftable collar 27 by headed bolts 36, whereby the position of the disk on the tap with relation to this shiftable collar 27 may be adjusted. In other words, the position of the disk on the tap may be adjusted so as to shift the collar and thereby trip the cutters according to the depth of cut desired, this disk at the proper time coming into engagement with the work or a fixed piece adjacent thereto, whereby it is pushed back, thereby carrying the locking collar 27 with its locking pin 28' out of the opening 29 in the cap and its pin 28" into the opening 29' of the fixed collar or ring 30, whereupon the spring 8" will rotate the core 8, and this being pinned to the cam sleeve 15 and ring 17, operates all of these parts together by rotating them the desired distance, and consequently causing the cam to trip or collapse the cutters inwardly and release them from the work.

One of the disadvantages of taps as heretofore constructed is that the working end has been so closed by an end plate that it was extremely difficult to clean the tap and remove the chips and fine dust, which would quickly clog the cutters, very materially interfering with the proper work of the tap. In the present improvement we have eliminated this disadvantage by providing a front or end plate 38 having an opening the full diameter of the core piece. This cap not only provides a bearing for the four corners of the core piece, but, by reason of the somewhat hollowed-out or concaved form of the core piece, provides a sufficient clearance space for the chips to work out and thus prevent the clogging of the cutters which has heretofore occurred by the fine chips and dust working into the cutter slots and so causing the tap to clog. Furthermore, these clearance spaces provide a means for readily cleaning the tap of the fine dust and chips that do not work out, by simply applying air pressure to the body of the tap, thereby to blow out the dust and chips.

This end plate 38 is suitably fastened to the end of the tap head by screws and is radially slotted to permit the forward ends of the cutters to overhang, if desired, thereby giving a longer tapping or cutting surface. This plate is provided with a series of rearwardly-extending flanges 39 spaced apart by the cutter slots and adapted to fit the projecting rabbeted portion 7 of the head. Each of these flanges at one end is dovetailed, as at 40, to insure a tight fit on the projecting portion 7 of the head, whereby a very accurate fitting of the cap to the head is obtained.

By having the front or end plate bored to the full diameter of the working end of the core piece, this also enables the core piece to project forward a greater distance than heretofore, and consequently the overhang of the cutters does not extend beyond the core piece, as has been the practice heretofore, so that the cutters are more efficiently supported.

From the foregoing it will be observed that in the present improved construction of tap the cutters are not only positively supported on their under faces by the core piece, but are also supported in all positions thereof on their exterior, rearwardly-projecting or tail portions by the cam sleeve, which, being pinned to the core piece, turns therewith, so that the chasers are not only positively tripped or collapsed by this cam sleeve, but they are positively held against any tipping at the forward ends thereof, and, therefore, the accurate cutting of the work is insured, while at the same time the shifting of the cutters inward and outward is positively obtained without depending upon the uncertain action of springs. Consequently, there is no opportunity for the rear ends of the cutters to rise up or to spread apart or away from the core piece, with the consequent cutting of an imperfect or tapered thread. The cam portions 15' of the cam sleeve 15 are so constructed that they are always at the same distance from the core piece, so that the chasers are thus supported both on the inside and on the outside, and consequently positively guided in and out during the adjustments and shifting thereof. In other words, when the core piece turns by reason of its spring, the cam sleeve turns with it to the high point on the cams, which, being in engagement at all times with the rear ends or tails of the cutters, causes them to recede into the tap body, thus positively tripping the cutters. When, by means of the handle, the cutters are re-set into their desired adjusted positions, the cam sleeve moving with the core piece and being in positive engagement with the rear ends of the cutters, support these rear ends and prevent any play thereof, and consequently any tipping of the cutters in use.

In operation it will thus be understood that the handle 26 is shifted to rotate or oscillate the core members 8, so that the corners 10 thereof will force or project outwardly the cutters the desired distance, this being determined by the setting of the adjustable screws 22 in the cap 21. This shifting of the handle 26 also rotates or oscillates the cap 21 into position to carry the opening 29 in the rear thereof in alignment with the projecting locating or locking pin 28' of the shiftable locking ring 27, whereupon the springs 31 between this ring 27 and the fixed ring 30 force the shiftable locking ring 27 forward to carry the pin 28' thereof into the opening 29 of the cap 21 and so lock the cutters in their adjusted positions, and likewise the core member in position, the pin 28" at this time being carried out of the opening 29' of the fixed ring 30. Thereupon the tap is fed forward in the usual way to engage and tap the work. When a piece of work has been completely tapped, the tripping disk 34 will come into engagement with the forward end of the work or with a suitable projection, whereupon the further forward movement of the tap operates to push back this disk 34 and with it the shiftable locking ring 27 against the tension of the springs 31, thereby to carry its locking pin 28' out of the cam cap 21, thereby releasing the cam cap and the cam sleeve, whereupon the core spring will rotate the core piece in the opposite direction to that in which it is rotated by the handle and carry the corners 10 of the core piece from under the cutters, at the same time rotating the cam sleeve with the core piece, so that the cams thereof in engagement with the tails of the cutters will positively force the cutters inwardly or collapse them and the tap thereupon withdrawn from the work. The adjustment of the adjusting screws with relation to the projections or lugs 18 on the rear of the ring 17 determines, of course, the position of the corners 10 of the core piece 8 with relation to the cutters, so that by this means the cutters may be adjusted within certain limits to engage smaller or larger pieces of work.

It is to be understood that by describing in detail herein any particular form, structure or arrangement, it is not intended to limit the invention beyond the terms of the several claims or the requirements of the prior art.

Having thus explained the nature of our said invention and described a way of constructing and using the same, although without attempting to set forth all of the forms in which it may be made, or all of the modes of its use, we claim:

1. A collapsible tap comprising a bored and radially slotted body having a bored shank, a plurality of radially shiftable cutters located in the slots of said body, rotatable means for supporting the under faces of the cutters and positively expanding them, positively acting means connected with said expanding means for supporting outer faces of the cutters to prevent the tipping thereof and effective to positively retract the cutters, means within the shank bore for automatically rotating said expanding means thereby to shift the retracting means to retract the cutters, means forming part of the tap for locking the retracting means, and means for releasing said locking means on the forward movement of the tap whereby the expanding means will shift the retracting means.

2. A collapsible tap comprising a bored and radially slotted body, having a bored shank, a plurality of radially shiftable cutters located in the slots of said body, rotatable means for supporting the under faces of the cutters and positively expanding them, positively acting means connected with said expanding means for supporting outer faces of the cutters to prevent the tipping thereof and effective to positively retract the cutters and comprising a rotatable cam sleeve located on the body and in engagement with said cutters, said cutters and sleeve one having cam surfaces, means within the shank bore for automatically rotating said expanding means and thereby the cam sleeve to retract the cutters, means forming part of the tap for locking the sleeve, and means for releasing said locking means on the forward movement of the tap whereby the expanding means will shift the sleeve.

3. A collapsible tap comprising a bored and radially slotted body having a bored shank, a plurality of radially shiftable cutters located in the slots of said body, rotatable means for supporting the under faces of the cutters and positively expanding them, positively acting means for supporting outer faces of the cutters to prevent the tipping thereof and effective to positively retract the cutters and comprising a rotatable sleeve, said sleeve and cutters one having cam surfaces, said retracting sleeve and rotatable expanding means being connected for simultaneous movement, means within the shank bore for automatically rotating the expanding means and thereby the sleeve to retract the cutters, means forming part of the tap for locking the sleeve, and means for releasing said locking means on the forward movement of the tap whereby the expanding means will shift the sleeve.

4. A collapsible tap comprising a bored and radially slotted body having a bored shank, a plurality of radially shiftable cutters located in the slots of said body, rotatable means for supporting the under faces of the cutters and positively expanding them, positively acting means for supporting outer faces of the cutters to prevent the tipping thereof and effective to positively retract the cutters, and comprising a rotatable cam sleeve overlapping the tail end of the cutters and connected with the expanding means, means within the shank bore for automatically rotating the expanding means and thereby the sleeve to retract the cutters, means forming part of the tap for locking the sleeve, and means for releasing said locking means on the forward movement of the tap whereby the expanding means will shift the sleeve.

5. A collapsible tap comprising a bored and radially slotted body having a bored shank, a plurality of radially shiftable cutters located in the slots of said body, means for supporting the under faces of the cutters and positively expanding them, positively acting means for supporting outer faces of the cutters to prevent the tipping thereof and effective to positively retract the cutters, said expanding means comprising a core member located in the bore of the body for rotatable movement, and said retracting means comprising a cam sleeve mounted on the body and rotatable simultaneously with said core member, means within the shank bore for automatically rotating said core member and thereby the retracting means to retract the cutters, means forming part of the tap for locking the retracting means, and means for releasing said locking means on the forward movement of the tap whereby the expanding means will shift the retracting means.

6. A collapsible tap comprising a bored and radially slotted body, a plurality of radially shiftable cutters located in the slots of said body, means for supporting the under faces of the cutters and positively expanding them, positively acting means for supporting the outer faces of the cutters to prevent the tipping thereof and effective to positively retract the cutters, said expanding means comprising a core member located in the bore of the body for rotatable movement, and said retracting means comprising a cam sleeve mounted on the body and rotatable simultaneously with said core member, means within the body for automatically rotating said core member and thereby rotating the retracting means to retract the cutters and means for simultaneously adjusting the cam sleeve and core member thereby to adjust the cutters.

7. A collapsible tap comprising a bored and radially slotted body, a plurality of radially shiftable cutters located in the slots of said body, means for supporting the under faces of the cutters and positively expanding them, positively acting means for supporting the outer faces of the cutters to prevent the tipping thereof and effective to positively retract the cutters, said expanding means comprising a core member located in the bore of the body for rotatable movement and said retracting means comprising a cam sleeve mounted on the body and rotatable simultaneously with said core member, means within the body for automatically rotating said core member and thereby rotating the retractive means to retract the cutters, means for simultaneously adjusting the cam sleeve and core member thereby to adjust the cutters, and means cooperating with said cam sleeve for locking the cutters in their adjusted positions.

8. A collapsible tap comprising a bored and radially slotted body, a plurality of radially shiftable cutters located in the slots of said body, means for supporting the under faces of the cutters and positively expanding them, positively acting means for supporting the outer faces of the cutters to prevent the tipping thereof and effective to positively retract the cutters, said expanding means comprising a core member located in the bore of the body for rotatable movement and said retracting means comprising a cam sleeve mounted on the body and rotatable simultaneously with said core member, means within the body for automatically rotating said core member and thereby rotating the retracting means to retract the cutters, means for simultaneously adjusting the cam sleeve and core member thereby to adjust the cutters, means cooperating with said cam sleeve for locking the cutters in their adjusted positions, and means for tripping said locking means.

9. A collapsible tap comprising a bored and radially slotted body, a plurality of radially shiftable cutters located in the slots of said body, a rotatable core member including a coiled spring located in the bore of said body and wound and held under tension relatively to the body for shifting the cutters outwardly and for supporting them in their cutting positions, a rotatable cam sleeve carried by the body and connected to the core member for rotation therewith on the automatic rotation of the core member to retract the cutters and for supporting them in opposition to the support of the core member thereby to prevent the tipping of the cutters, means forming part of the tap for locking the sleeve, and means for releasing said locking means on the forward movement of the tap whereby the core member will shift the sleeve.

10. A collapsible tap comprising a bored and radially slotted body, a plurality of radially shiftable cutters located in the slots of said body, a rotatable core member including a coiled spring located in the bore of said body and wound and held under tension relatively to the body for shifting the cutters outwardly and for supporting them in their cutting positions, a rotatable cam sleeve carried by the body and connected to the core member for rotation therewith on the automatic rotation of the core member to retract the cutters and in position to engage the rear end of the cutters for supporting them in opposition to the support of the core member thereby to prevent the tipping of the cutters, means forming part of the tap for locking the sleeve, and means for releasing said locking means on the forward movement of the tap whereby the core member will shift the sleeve.

11. A collapsible tap comprising a bored and radially slotted body, a plurality of radially shiftable cutters located in the slots of said body, a rotatable core member including a coiled spring located in the bore of said body and wound and held under tension relatively to the body for shifting the cutters outwardly and for supporting them in their cutting positions, a rotatable cam sleeve carried by the body and connected to the core member for rotation therewith on the automatic rotation of the core member to retract the cutters and for supporting them in opposition to the support of the core member thereby to prevent the tipping of the cutters, means for setting and locking the core member in position to maintain the cutters in their cutting positions and means for releasing said locking means on the forward movement of the tap, whereby the core member will shift the sleeve.

12. A collapsible tap comprising a bored and radially slotted body, a plurality of radially shiftable cutters located in the slots of said body, a rotatable core member including a coiled spring located in the bore of said body and wound and held under tension relatively to the body for shifting the cutters outwardly and for supporting them in their cutting positions, a rotatable cam sleeve carried by the body and connected to the core member for rotation therewith on the automatic rotation of the core member to retract the cutters and for supporting them in opposition to the support of the core member thereby to prevent the tipping of the cutters, means for simultaneously adjusting the core member and cam sleeve thereby to adjust the cutters, and means for setting and locking the core member and cam sleeve to maintain and support the cutters in their cutting positions.

13. A collapsible tap comprising a bored and radially slotted body, a plurality of radially shiftable cutters located in the slots of said body, a rotatable core member including a coiled spring located in the bore of said body and wound and held under tension relatively to the body for shifting the cutters outwardly and for supporting them in their cutting positions, a rotatable cam sleeve carried by the body and connected to the core member for rotation therewith on the automatic rotation of the core member to retract the cutters and for supporting them in opposition to the support of the core member thereby to prevent the tipping of the cutters, means for simultaneously adjusting the core member and cam sleeve thereby to adjust the cutters, means for setting and locking the core member and cam sleeve to maintain and support the cutters in their cutting positions, and means for releasing the core member and cam sleeve thereby to collapse the cutters.

14. A collapsible tap comprising a bored and radially slotted body, a plurality of radially shiftable cutters located in the slots of said body, a rotatable core member including a coiled spring wound and held under tension in the bore of said body for shifting the cutters outwardly and for supporting them in their cutting positions and having a plurality of corners corresponding with the number of cutters, said corners projecting beyond the core body, and an end cap secured to the body and having an opening, the diameter of which corresponds to the full diameter of the core thereby providing a bearing for the core corners and a clearance space around the core intermediate the corners thereof.

15. A collapsible tap comprising a bored and radially slotted body, a plurality of radially shiftable cutters located in the slots of said body, a rotatable core member including a coiled spring wound and held under tension in the bore of said body for shifting the cutters outwardly and for supporting them in their cutting positions and having a plurality of corners corresponding with the number of cutters, said corners projecting beyond the core body, an end cap secured to the body and having an opening, the diameter of which corresponds to the full diameter of the core thereby providing a bearing for the core corners and a clearance space around the core intermediate the corners thereof, means for locking the core member in position to maintain the cutters shifted outwardly, and means for positively supporting exterior faces of the cutters and retracting the cutters.

16. A collapsible tap comprising a bored and radially slotted body, a plurality of radially shiftable cutters located in the slots of said body, a rotatable core member including a coiled spring wound and held under tension in the bore of said body for shifting the cutters outwardly and for supporting them in their cutting positions and having a plurality of corners corresponding with the number of cutters, said corners projecting beyond the core body, and an end cap secured to the body and having an opening, the diameter of which corresponds to the full diameter of the core thereby providing a bearing for the core corners and a clearance space around the core intermediate the corners thereof, said cap having rearwardly projecting flanges fitting the forward end of the body.

17. A collapsible tap comprising a bored and radially slotted body, a plurality of radially shiftable cutters located in the slots of said body, a rotatable core member including a coiled spring wound and held under tension in the bore of said body for shifting the cutters outwardly and for supporting them in their cutting positions and having a plurality of corners corresponding with the number of cutters, said corners projecting beyond the core body, an end cap secured to the body and having an opening, the diameter of which corresponds to the full diameter of the core thereby providing a bearing for the core corners and a clearance space around the core intermediate the corners thereof, means for locking the core member in position to maintain the cutters shifted outwardly, and means for positively supporting exterior faces of the cutters and retracting the cutters and comprising a cam sleeve mounted on the body and pinned to the core member for movement therewith.

18. A collapsible tap comprising a bored and radially slotted body, a plurality of radially shiftable cutters located in the slots thereof and having overhanging front ends, a rotatable core member including a coiled spring wound and held under tension in the bore of said body for shifting the cutters outwardly and for supporting them in their cutting positions and having a plurality of corners corresponding with the number of cutters, said corners projecting under the overhang of said cutters, an end cap secured to the body and located within the overhanging ends of said cutters, means for retracting the cutters, and means for locking the cutters in their cutting positions.

19. A collapsible tap comprising a bored and radially slotted body, a plurality of radially shiftable cutters located in the slots thereof and having overhanging front ends, a rotatable core member including a coiled spring wound and held under tension in the bore of said body for shifting the cutters outwardly and for supporting them in their cutting positions and having a plurality of corners corresponding with the number of cutters, said corners projecting under the overhang of said cutters, an end cap secured to the body and located within the overhanging ends of said cutters, positively acting means for retracting the cutters and for positively supporting the rear ends thereof and prevent the tipping of the cutters, and means for locking the cutters in their cutting positions.

20. A collapsible tap comprising a bored and radially slotted body, a plurality of radially shiftable cutters located in the slots of said body and having projecting rear ends and overhanging front ends, a rotatable corner formed core member located in the bore of said body and including a coiled spring and wound and held under tension for rotation relatively to the body for shifting the cutters outwardly and for supporting them in their cutting positions, said core member projecting under the overhang of said cutters, a rotatable cam sleeve carried by the body and in position to engage the rear ends of the cutters for supporting them in opposition to the support of the core member thereby to prevent the tipping of the cutters and rotatable to retract the cutters, a ring carried by said cam sleeve and pinned together with the cam sleeve to the core member for rotation therewith and having rearwardly extending lugs, a cap loosely mounted on the body and encircling and adjustably connected to said ring, cutter adjusting devices carried by said cap and engaging said ring lugs for adjusting the cam member and core simultaneously thereby to adjust the cutters into the desired working position, a ring fixed to the body, a shiftable locking ring also mounted on the body between said fixed ring and cap and having a transverse locking pin adapted to project into the cap to prevent shiftable movement of the cap and into the fixed ring on the rearward shifting of said locking ring, compressible springs located between said locking ring and fixed ring, means carried by the body and adjustably connected with the shiftable locking ring for shifting said ring at a predetermined time thereby to carry its locking pin out of engagement with the cap thereby to permit the spring wound core member and cam sleeve to rotate to retract the cutters, means connected with the cap for rotating the same thereby to rotate the cam ring and core to reset the cutters, and an end cap for receiving the front end of the core and having an opening corresponding to the full diameter of the core and forming clearance spaces between the corners of said core.

21. A collapsible tap comprising a bored and radially-slotted body, a plurality of radially-shiftable cutters located in the slots of said body, means for supporting under faces of the cutters and positively expanding them, positively-acting means for supporting the outer faces of the cutters to prevent tipping thereof and effective to positively retract the cutters and comprising a rotatable sleeve mounted on the body, said sleeve and cutters one having cam-formed faces, a ring carried by said sleeve and pinned thereto for rotation therewith and having rearwardly-extending lugs, a cap loosely mounted on the body and encircling and adjustably connected to said ring, and cutter-adjusting devices carried by said cap and engaging said ring lugs for adjusting the cam member thereby to adjust the cutters into the desired working position.

22. A collapsible tap comprising a bored and radially-slotted body, a plurality of radially-shiftable cutters located in the slots of said body, means for supporting under faces of the cutters and positively expanding them, positively-acting means for supporting the outer faces of the cutters to prevent tipping thereof and effective to positively retract the cutters and comprising a rotatable sleeve mounted on the body, said sleeve and cutters one having cam-formed faces, a ring carried by said sleeve and pinned thereto for rotation therewith and having rearwardly-extending lugs, a cap loosely mounted on the body and encircling and adjustably connected to said ring, cutter-adjusting devices carried by said cap and engaging said ring lugs for adjusting the cam member thereby to adjust the cutters into the desired working position, and means engaging the ring for locking the cutters in their adjusted position.

23. A collapsible tap comprising a bored and radially-slotted body, a plurality of radially-shiftable cutters located in the slots of said body, a rotatable core for supporting under faces of the cutters and positively expanding them, positively-acting means for supporting the outer faces of the cutters to prevent tipping thereof and effective to positively retract the cutters and comprising a rotatable cam sleeve, a ring carried by said cam sleeve and pinned together with the cam sleeve to the core member for rotation therewith and having rearwardly-extending lugs, a cap loosely mounted on the body and encircling and adjustably connected to said ring, and cutter-adjusting devices carried by said cap and engaging said ring lugs for adjusting the cam member and expanding means simultaneously thereby to adjust the cutters into the desired working position.

24. A collapsible tap comprising a bored and radially-slotted body, a plurality of radially-shiftable cutters located in the slots of said body, a rotatable core for supporting under faces of the cutters and positively expanding them, positively-acting means for supporting the outer faces of the cutters to prevent tipping thereof and effective to positively retract the cutters and comprising a rotatable cam sleeve, a ring carried by said cam sleeve and pinned together with the cam sleeve to the core member for rotation therewith and having rearwardly-extending lugs, a cap loosely mounted on the body and encircling and adjustably connected to said ring, cutter-adjusting devices carried by said cap and engaging said ring lugs for adjusting the cam member and expanding means simultaneously thereby to adjust the cutters into the desired working position, and means engaging said ring for locking the cutters in their adjusted position.

Signed at Cleveland, Ohio, this 16th day of January, 1928.

WILLIAM J. HOGG.
FREDERICK NEUMANN.